Jan. 17, 1967    H. A. SAVAGE    3,298,391
TWO WAY FLOW ANTI-SIPHON VALVE ASSEMBLY
Filed March 22, 1965    2 Sheets-Sheet 1

INVENTOR.
HARRY A. SAVAGE
BY
*Salvatore G. Militana,*
attorney

Jan. 17, 1967   H. A. SAVAGE   3,298,391
TWO WAY FLOW ANTI-SIPHON VALVE ASSEMBLY
Filed March 22, 1965   2 Sheets-Sheet 2

INVENTOR.
HARRY A. SAVAGE
BY
Salvatore G. Militana,
attorney

United States Patent Office 3,298,391
Patented Jan. 17, 1967

3,298,391
TWO WAY FLOW ANTI-SIPHON VALVE ASSEMBLY
Harry A. Savage, Miami, Fla., assignor of fifty percent to Donald W. Barlow, Miami, Fla.
Filed Mar. 22, 1965, Ser. No. 441,504
2 Claims. (Cl. 137—493)

This invention relates to valve structures and is more particularly directed to a two way flow valve assembly having anti-siphoning characteristics.

A principal object of the present invention is to provide a valve assembly that permits the flow of fluids under pressure in either direction and still prevents the siphoning of fluid in the reverse direction upon termination of the flow of fluid under pressure.

A further object of the present invention is to provide a valve assembly having a fluid passageway at each end which can be connected in a fluid system for the flow of fluid under pressure at either passageway.

Another object of the present invention is to provide a two way flow anti-siphon valve assembly which is simple in construction, positive in action and which consists of only four different parts that may be readily assembled.

A further object of the present invention is to provide a valve assembly having an elongated valve body with a resilient sleeve valve normally enclosing a plurality of ducts and upon subjecting the resilient sleeve valve to a fluid under pressure at one of the ducts, the sleeve valve will become extended and permit the flow of fluid under pressure to flow to the other of the ducts.

A still further object of the present invention is to provide a two way flow anti-siphoning valve assembly which cannot be incorrectly connected in a fluid system inasmuch as fluid under pressure can flow therethrough in either direction.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 1:
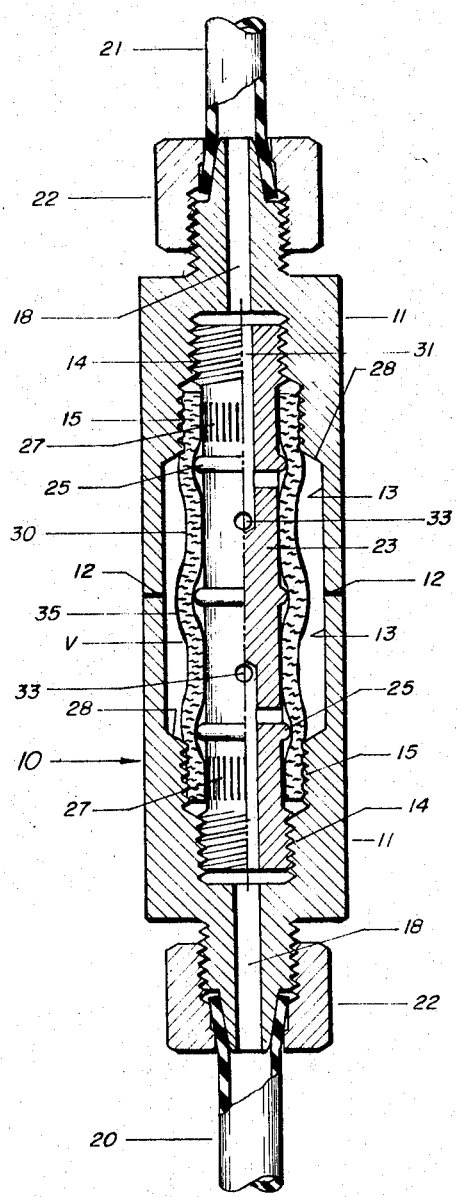
FIGURE 1 is a longitudinal cross sectional view of a two way flow anti-siphon valve assembly constructed in accordance with my invention.
Figure 2:
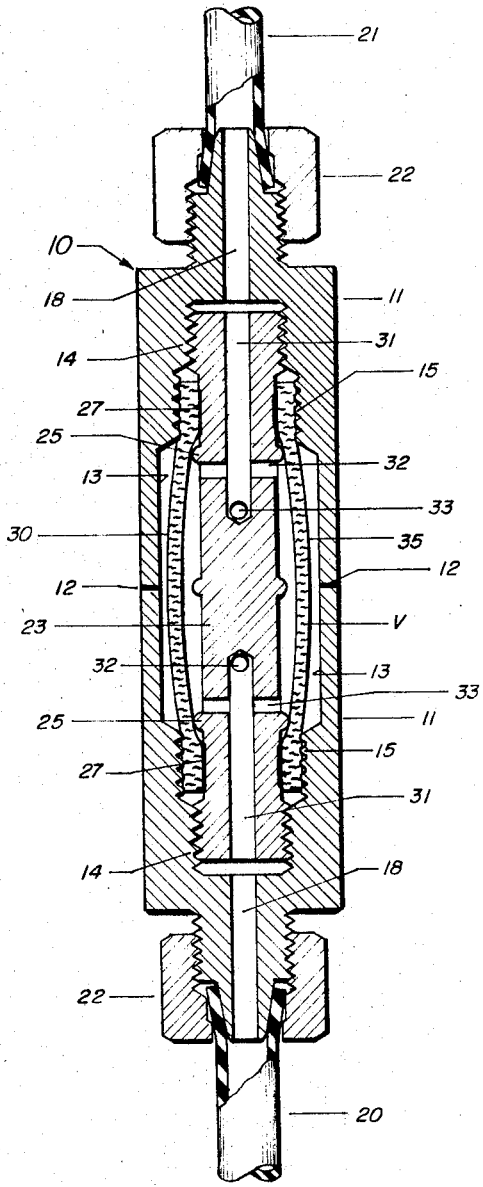
FIGURE 2 is a similar view showing the operation of its sleeve valve when fluid under pressure is flowing therethrough.
Figure 3:
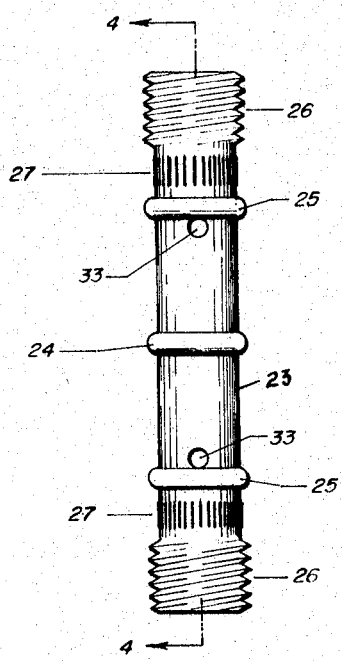
FIGURE 3 is a side elevational view of my valve body member as shown removed from the assembly.
Figure 4:
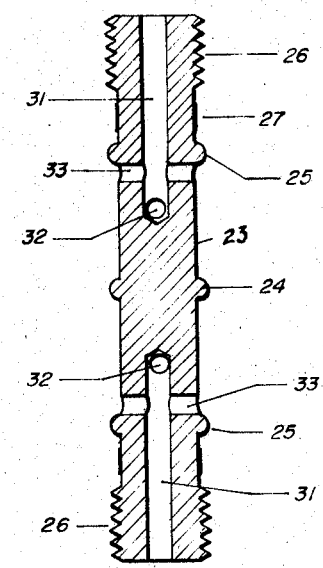
FIGURE 4 is a longitudinal cross sectional view taken along the line 4—4 of FIGURE 3.
Figure 5:
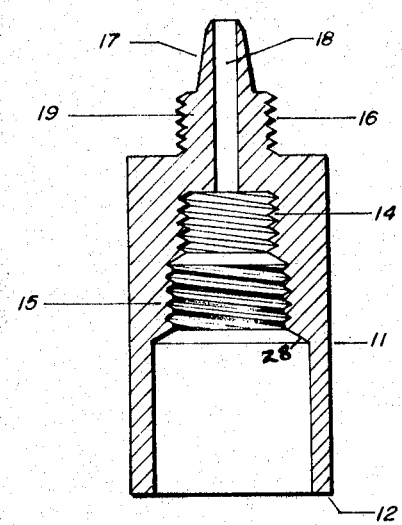
FIGURE 5 is a cross sectional view of one-half of the valve housing as seen removed from the assembly, the other half of the valve housing being identical in construction.

Referring to the drawings wherein like numerals are used to designate various parts throughout the several views, the numeral 10 refers to a two way flow anti-siphon valve assembly constructed in accordance with my invention consisting of a housing formed of two halves 11 of identical construction and positioned in abutting relation at their end portions 12. The housings 11 are provided with a chamber 13 for receiving a valve body assembly V and are each further provided with coaxially positioned threaded portions 14 and 15. The threads of the threaded portions 14 and 15 are identical in every respect such as pitch, depth, etc. except that the diameter at the threaded portion 15 is larger than that at the threaded portion 14. This structure permits the positioning of valve body assembly V in the assembly of the valve 10 as is explained in detail hereinafter.

The outer ends opposite that of the end portion 12 of the housings 11 are threaded as at 16 on a neck portion 19, while the extreme end is tapered as at 17. A centrally disposed fluid duct or passageway 18 extends from the free end of the tapered portion 17 to the chamber 13. The ends of each of the fluid pipe lines 20 and 21 are fitted over the tapered portions 17 and maintained therein in fluid tight connection by means of compression nuts or couplers 22.

Within the chambers 13 and threaded into the threaded portions 14 of the housings 11 is the valve body assembly V consisting of a cylindrical body member 23 at whose mid portion is a peripherally disposed ridge 24 with a further peripheral ridge 25 on the body portion 23 on each side of the ridge 24 and about mid-way to the ends of the body member 23. At each end of the body member 23 is a threaded portion 26 which is received by the threaded portions 14 when the valve body member 23 is positioned within the housings 11. Between the threaded portion 15 and the ridges 25, the valve body member 23 is knurled as at 27 for the purpose of preventing a resilient sleeve valve 30, which is positioned on the valve body member 23 from rotating relative to the valve body member 23 as the latter is threaded into position in the housings 11.

From each end of the valve body member 23 there extends an axially disposed duct 31 that terminates short of each other so that they do not communicate with each other, but do communicate with a pair of radially disposed bores 32 and 33 which are approximately 90 degrees removed from each other as well as being out of coplanar relationship. The ducts 32 and 33 extend to the outer surfaces of the valve body member so that fluid can flow through either of the passageways 31, and into the ducts 32 and 33 to be discharged therefrom. A resilient sleeve 35 is fitted snugly over the valve body member 23 extending completely thereover except for the threaded portions 26 thereby covering all of the ducts 32 and 33.

The procedure for assemblying the various parts that constitute my anti-siphon valve is extremely simple and readily accomplished. First, the resilient sleeve valve 30 is slipped into position over the valve body member 23. Note that the sleeve valve 30 will cover the knurled portions 27 but not the threads 26. The valve body member 23 is then inserted into one of the housings 11 with one of the threaded portions 26 of the valve body member 23 being received by the threads 14 of the housing 11 as the outer surface of the resilient sleeve valve 30 is engaged by the adjacent threads 15. The valve body member 23 is then rotated in the housing 11 until the resilient sleeve valve 30 at the position of the ridge 25 engages the inclined surface 28 of the chamber 13 to seal against any leakage of fluid past the ridge 25.

Now, another housing 11 is placed over the unengaged end of the valve body member 23 and again the threads 26 of the valve body 23 are received by the threads 14 of the second housing 11 and threaded together until completely housed therein. The ends 12 of the housing 11 will abut against each other as the inclined surface 28 engages the resilient sleeve valve 30 as explained above in connection with the first housing 11. The chamber 13, 13 is larger than the diameter of the valve body member 23 with the sleeve valve 30 thereon to permit space for the resilient sleeve valve 30 which expands as fluid under pressure flows from one of the pair of ports 32, 33 to the other. Also, the juncture of the ends 12 of the housings 11 is not fluid tight thereby permitting air to flow in and out of the chambers 13 as the resilient sleeve valve 30 stretches away from the valve body member 23 and returns to its normal position in cycling fashion.

When it is desired to use my valve assembly 10, it is placed in the system, wherein it is essential that siphoning effect is completely nullified, by fitting the pipe lines 20, 21 of the system on the tapered ends 17 of the housings 11 and the compression nuts 22 are tightened thereon. One of the pipe lines 20, 21 will be connected to a source of fluid under pressure, the fluid being a liquid or a gas, while the other pipe line will be connected to a point of delivery of the fluid. Fluid under pressure entering one of the housings 11 will pass through the passageways 18, 31 and into the lateral ducts 32 and 33 where the pressure of the fluid will be exerted against the inner surface of the resilient sleeve valve 30 to cause the latter to stretch away from the valve body member 23. Fluid under pressure will now flow in the space thus formed along the outer surface of the valve body member 23 to the other pair of ports or ducts 32, 33 to be discharged through the fluid passageways 31, 18 and the pipe line 20 or 21. As soon as the flow of fluid under pressure is cut off at the source of the pressure, the resilient sleeve valve 35 will snap back to its original position. Any fluid within the resilient sleeve valve 30 will continue to flow under the influence of the resilient sleeve valve 30 until the sleeve valve has returned to its normal or contact relation with the valve body member 23 when all flow of fluid has terminated. No reverse flow of fluid can occur because the ducts 32 and 33 will be sealed by the resilient sleeve valve 30 and the medium ridge 24 seals against any flow of fluid so long as the sleeve is engaged thereon. If there should occur a suction effect on either pipe lines 20 or 21, the resilient sleeve valve 30 will be drawn to seal the outlets of the ducts 32 and 33 even more firmly as well as the resilient sleeve valve 30 engaging the ridge 24 more tightly. Consequently, fluid under pressure will flow through my valve assembly 10 in either direction while suction on any end of the valve assembly 10 will not permit fluid to flow therethrough. Siphoning effect is brought about when fluid under pressure is flowing past a valve which when the pressure is cut off, a suction is effected where pressure once existed and the valve is incapable of remaining closed to permit the back flow of fluid through the valve. This siphoning effect cannot occur in my two way flow anti-siphon valve assembly 10 since flow cannot occur in my valve assembly 10 until a positive pressure is imposed on the fluid at the position of the resilient sleeve valve 30. Also, my valve assembly 10 permits fluid under pressure to flow in either direction so that it may be used in systems that require flow in either direction without the danger of any siphon-action occuring.

Having disclosed my invention, what I claim as new and desire to secure by Letters Patent of the United States is:

1. A valve body for a two way flow anti-siphon valve assembly comprising a substantially cylindrical body member, threaded portions at each end of said body member, a knurled portion mounted on said body member adjacent each of said theraded portions, a peripheral ridge mounted on said valve body adjacent each of said knurled portions, substantially axially disposed fluid passageways extending from each end of said body member in a direction toward each other and terminating short of the mid-portion of said body member, a plurality of radially disposed ducts communicating with the inner ends of said fluid passageways and extending through the side wall of said body member, a pheripherally disposed ridge extending about said valve body and positioned between said radially disposed ducts, and a resilient sleeve telescopically mounted on said valve body between said threaded portions, engaging said peripheral ridge portions and said knurled portion and enshrouding said ducts.

2. A two way flow anti-siphon valve assembly comprising an elongated housing having a medially positioned chamber, pipe connecting means mounted at each end of said housing, threaded means mounted at each end of said chamber within said housing, said housing having a fluid passageway extending from each of said pipe connecting means to said threaded means, a valve body threadedly mounted at each end to said threaded means and extending in said chamber, said valve body having a fluid passage at each end extending toward each other and communicating with said housing fluid passageways, a peripheral ridge portion extending about said valve body, said valve body having ducts communicating with said fluid passages and extending to the outer surface of said valve body on each side of said peripheral ridge portion, a resilient sleeve telescopically positioned on said valve body extending between said threaded end portions, engaging said ridge portion and enshrouding said ducts, and means mounted on said housing and engaging end portions of said resilient sleeve, said sleeve engaging means having threaded portions mounted in said chamber adjacent said first named threaded portion and being of greater diameter than said first named threaded portion, whereby upon the flow of fluid under pressure to one of said housing fluid passageways, said fluid will flow through one of said valve body passages, to one of said ducts to expand said resilient sleeve and uncover said ducts and permit said fluid under pressure to flow into said other of said ducts and be discharged through said other of said fluid passageways.

References Cited by the Examiner

UNITED STATES PATENTS

| | | | |
|---|---|---|---|
| 2,107,596 | 2/1938 | Bourdon | 137—493 |
| 2,622,620 | 12/1952 | Annin | 251—5 |
| 2,786,642 | 3/1957 | Comb | 251—5 XR |
| 2,988,103 | 6/1961 | Canvasser | 251—5 XR |

FOREIGN PATENTS

| | | |
|---|---|---|
| 278,096 | 1/1952 | Switzerland. |
| 1,254,883 | 4/1960 | France. |

M. CARY NELSON, *Primary Examiner.*

R. J. MILLER, *Assistant Examiner.*